WILFRED N RODGERS,
INVENTOR

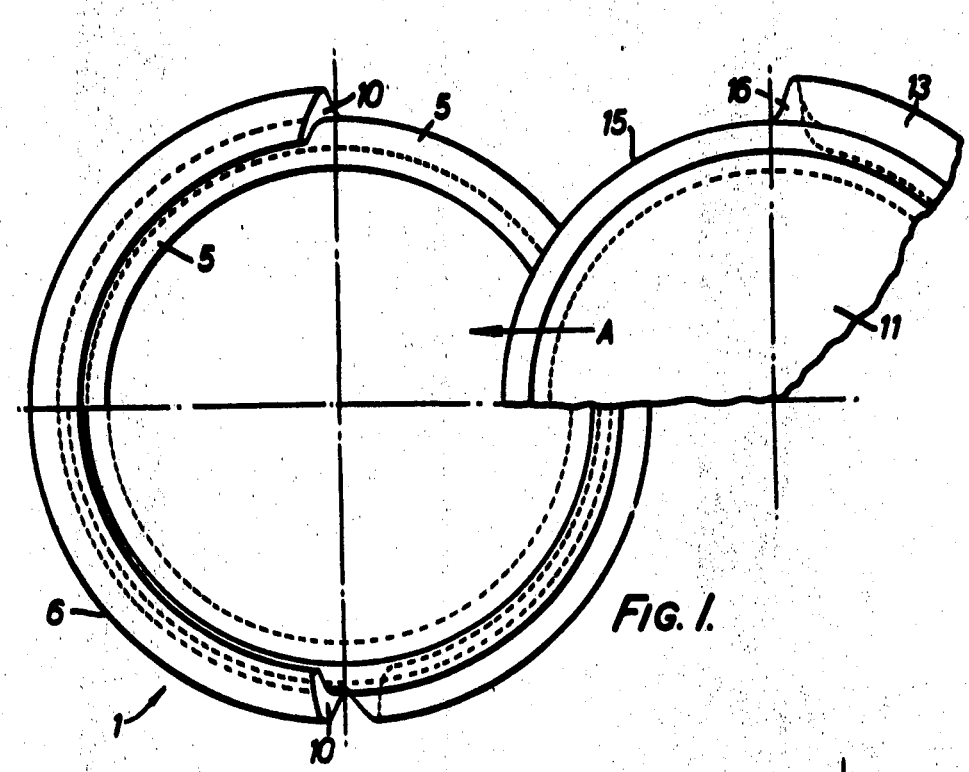
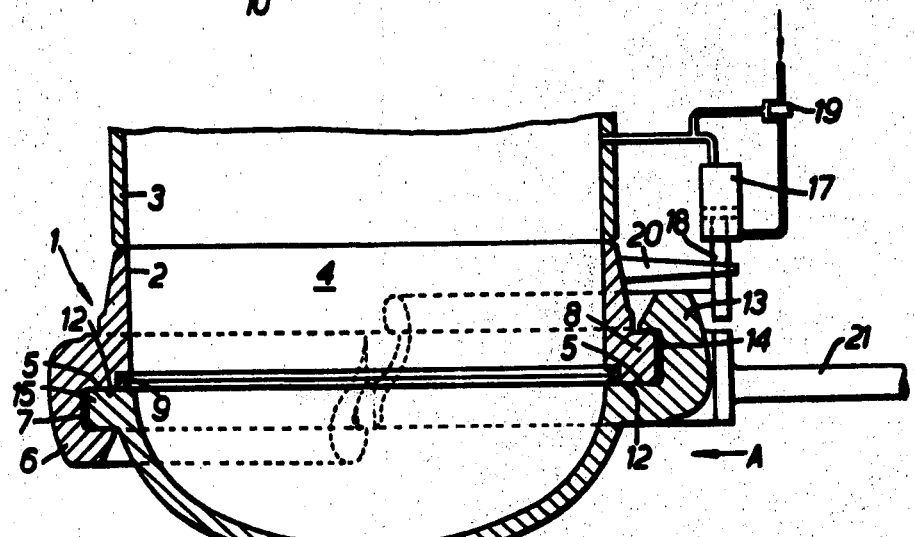
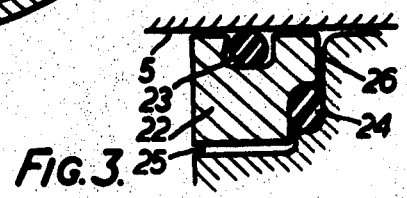
WILFRED N. RODGERS,
INVENTOR

BY
ATTORNEY

Sept. 20, 1971   W. N. RODGERS   3,605,337
CLOSURE MEMBER ARRANGEMENTS

Filed May 15, 1969   3 Sheets-Sheet 3

WILFRED N. RODGERS,
INVENTOR

BY *Hall & Houghton*
ATTORNEY

United States Patent Office 3,605,337
Patented Sept. 20, 1971

3,605,337
CLOSURE MEMBER ARRANGEMENTS
Wilfred Newrick Rodgers, Mickleover, England, assignor to International Combustion (Holdings) Limited, London, England
Filed May 15, 1969, Ser. No. 825,003
Int. Cl. E06b 3/34
U.S. Cl. 49—41
11 Claims

ABSTRACT OF THE DISCLOSURE

This invention relates to coupling devices for forming a fluid tight seal between two parts, and has particular reference to quick release couplings for use in pipelines or for closure members.

---

Figure 4:
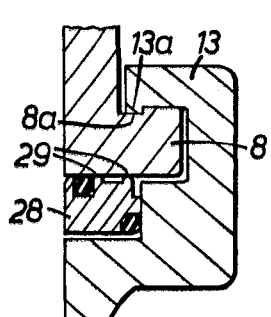

This invention is applicable to closure member arrangements. Such arrangements comprise, briefly, a closure door which co-operates with a component or components attached to or forming part of a pressure vessel, pipe or other container to close and expose an access opening therein. Ideally, the arrangement should be of relatively simple construction which permits easy and quick opening and closing of the door. However, many known closure member arrangements are not of that construction.

The invention is also applicable to couplers for hoses and pipes, for example quick release couplings for high pressure hoses where speed of attachment and release together with an effective leak-proof coupling are important.

According to the present invention a coupler arrangement comprises a collar part adapted to be secured round an opening, the collar having a continuous sealing surface round its periphery, and, extending round part only of the sealing surface, at least one extension forming a clamp with a groove facing inwardly across the collar, part at least of the remainder of the sealing surface having a lip extending outwardly across the collar, the arrangement also comprising a second part having a continuous sealing surface adapted to mate with the sealing surface on the collar, part only of the sealing surface on the second part having at least one lip which extends laterally and outwardly from the surface, part at least of the remainder of the sealing surface on the second part having at least one extension forming a collar clamp with a groove facing inwardly across the second part, the arrangement being such that relative sliding movement of the second part in one direction across the collar engages each lip on the second part in the groove of a clamp on the collar, and each lip on the collar with a collar clamp on the second part, whilst movement in the opposite direction disengages these parts.

The clamp may be integral with the collar, and the collar clamp may be integral with the second part. The sealing surface of the collar may accommodate one or more seals to prevent leakage. The sealing surface of the second part may accommodate one or more seals to prevent leakage.

The continuous sealing surface of the collar may be a planar surface, and the sealing surface of the second part may be a planar surface. The continuous sealing surface of the collar may be perpendicular to the axis of the opening. The seal or seals may be so arranged that it or they are exposed, when in use, to fluid pressures which distort the seal and enhance the effectiveness of the seal.

The clamps and lips may be provided with a cooperating groove and projection, the projection being engageable with the groove upon axial separation of the collar and the second part.

The seal may have a one side open to the atmosphere, and a second side open to the fluid inside the coupler, when in use, the arrangement being such that the seal is urged against a sealing surface by the fluid inside the coupler. The seal may comprise a member movable relative to the two sealing surfaces and being substantially rectangular in cross-section, the member carrying a first O-ring engageable with the sealing surface of the collar and a second O-ring engageable with the sealing surface of the second part.

Alternatively the seal may comprise an expansible diaphragm between the sealing surface of the collar and the sealing surface of the second part, the diaphragm being pressurisable, when in use, so as to expand and form a seal between the sealing surfaces. The diaphragm may be pressurised by fluid present, when in use, in the coupler.

The clamp on the collar may extend around half the periphery of the collar, and the clamp on the second part may extend around half the periphery of the second part.

There may be provided a locking mechanism to prevent the second part being uncoupled from the collar part whilst the coupler is pressurised. The locking mechanism may comprise a piston movable within a cylinder by the fluid pressure within the coupler, the piston having a rod which obviates movement of the second part. The second part may be held closed by a toggle lever being secured against movement by the piston rod.

The second part may be a closure member.

Figure 5:
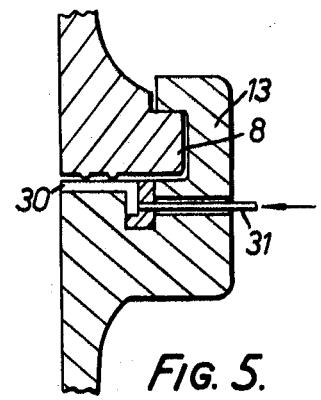
Figure 6:
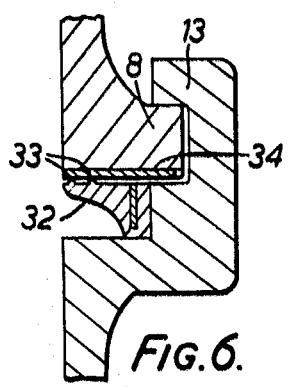
Figure 7:
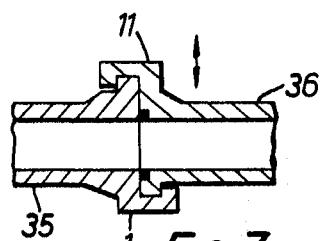
Figure 10:
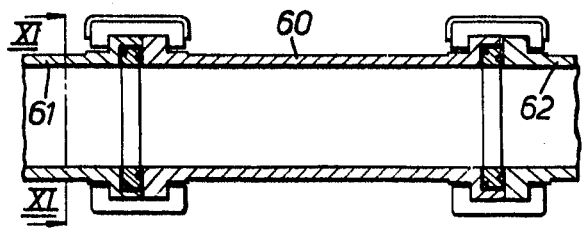
Figure 11:
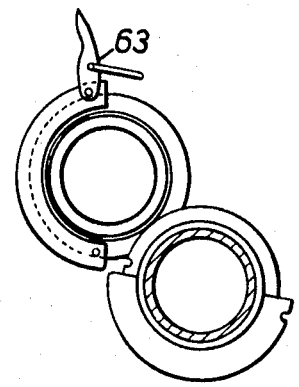
Figure 12:
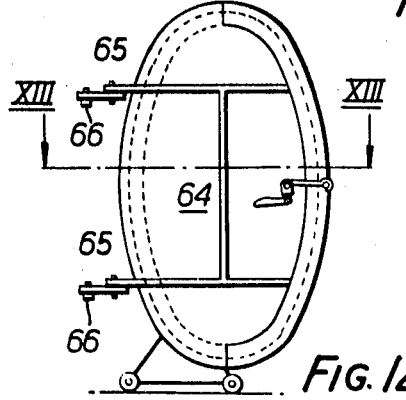
Figure 13:
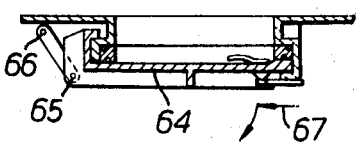
Figure 8:
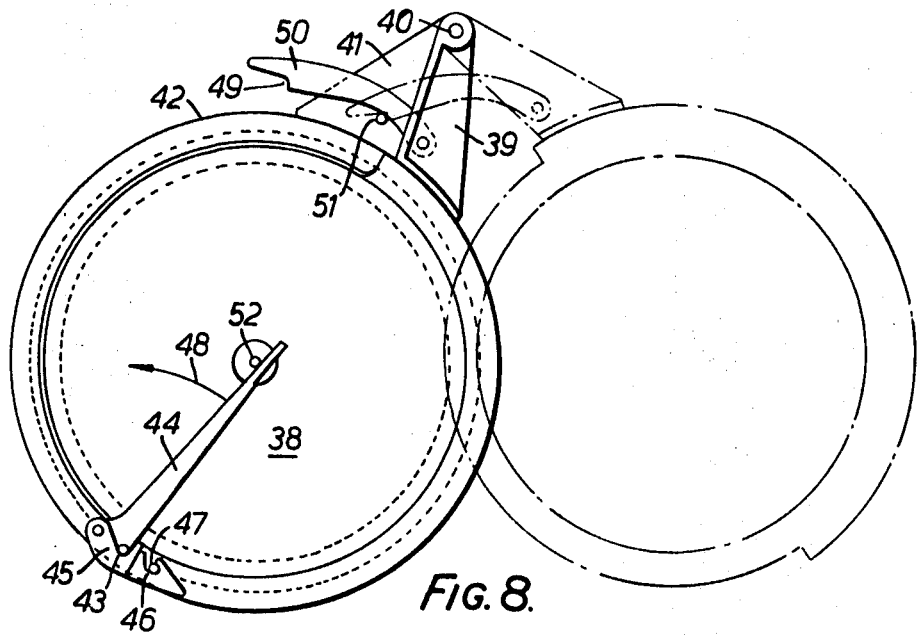
Figure 9:
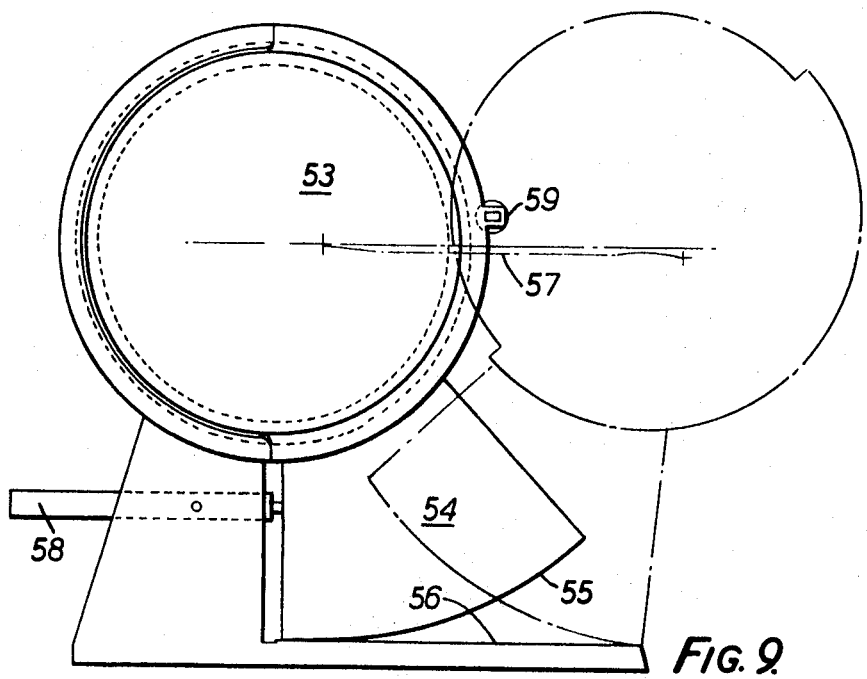

By way of example only, embodiments of the invention will now be described in greater detail with reference to the accompanying drawings of which:

FIG. 1 is a front view of the assembly,
FIG. 2 is a plan view partly in section of the assembly,
FIG. 3 is a section of part of an alternative form of seal,
FIGS. 4 to 6 are part sections showing, in diagrammatic form only, different forms of seal arrangement,
FIG. 7 is a section showing a coupler for two lengths of hose,
FIGS. 8 and 9 are end views of alternative forms of a door support system,
FIG. 10 is a cross-section of a pipe insert,
FIG. 11 is an end view of the insert of FIG. 10 when the insert is in the open position,
FIG. 12 is a front elevation of a hatch, and
FIG. 13 is a section along the lines XIII—XIII of FIG. 12.

The closure door assembly shown in FIGS. 1–3 comprises two main parts of which one is a collar 1 having a neck 2 by means of which the collar is secured, as by welding for example, to a pressure vessel part of which is shown at 3. When secured to the pressure vessel the collar 1 encircles an access opening 4 through which access to the interior of the vessel is obtained. The collar has an external, continuous flat sealing surface 5 over one half of which the collar is extended to form a door half-clamp 6. The half-clamp 6 has an inwardly-facing groove 7 formed in it. Over the other half of the sealing surface 5, the collar is formed with a lip 8. The inner periphery of the sealing surface 5 is stepped to accommodate a sealing ring 9 of resilient material, for example, an O-ring. The ends of the half-clamp 6 are bevelled as indicated at 10 in FIG. 1.

The other main part of the closure assembly is a door 11 of generally circular shape when seen in front elevation as in FIG. 1. The door 11 also has a continuous sealing surface 12 substantially equal in size to the surface 5. Over one half of the surface 12, the door has a collar half-clamp 13 substantially identical with half-clamp 6 and having an inwardly-facing groove 14. The other half of the surface 12 has a lip 15 corresponding with the lip 8. The ends of the half-clamp 13 are bevelled as indicated at 16, FIG. 1.

Bevelling of the ends of half-clamps 6 and 13 is not essential and in most cases, the ends will be square to mate with one another.

The door 11 is mounted adjacent the access opening in some convenient manner, dealt with in more detail later, which permits the door to slide to and fro across the opening to expose and close the latter. To close the opening, the door 11 slides in the direction of the arrows A across the opening so that the lip 15 enters the groove 7 and the lip 8 enters the groove 14, clearance between these components being sufficient to permit such engagement. At the end of its closing movement, the door is in the position shown in FIG. 2.

If now the inside of the pressure vessel is raised to a pressure greater than atmospheric pressure, the door cannot be forced off because of the restraining action of the half-clamps 6 and 13. Moreover, such internal pressure within the pressure vessel tends to distort the element 9 forcing it against the sealing surface 12 and holds the door against sliding movement in a direction opposite to that of arrow A.

In practice, it will normally be the case that some form of interlock is fitted to prevent the door being opened whilst the vessel is pressurised. This can be a simple piston held by the internal pressure and cancelled manually when the pressure is reduced to a safe level. For automatic operation, one form of interlock is shown diagrammatically in FIG. 2. A cylinder 17 containing a piston 18 is connected at one end to the interior of the pressure vessel and at the other end to another source of fluid pressure which might be an accumulator loaded from the pressure vessel via a two-way valve indicated by block 19. The piston 18 extends through a guide 20 and when the vessel is pressurised, the piston extends into the path of the door 11 and so prevents opening movement thereof. To withdraw the piston to permit opening movement of the door, valve 19 is operated to connect the accumulator to the other end of the cylinder, but the piston will not withdraw until the vessel pressure is reduced sufficiently to allow the accumulator pressure on the smaller piston area to overcome the vessel pressure on the larger area of the crown of the piston.

The door is mounted upon an operating mechanism part of which is shown at 21 in FIG. 2. The mechanism comprises a piston-cylinder unit, reference numeral 21 designating part of the piston. Power for the unit is derived from the pressure vessel via an accumulator in a manner similar to that described above with reference to the piston-cylinder unit 17, 18.

FIGS. 8 and 9 illustrate two alternative forms of door suspension. In the pendulum arrangement of FIG. 8, a door 38 is suspended by a member 39 which is pivoted at 40. The pivot 40 is positioned on an arm 41 mounted on the collar 42. The arrangement of the pivot 40 is such that at one end of its swing the door 38 closes off the collar, and at the other end of its swing, shown dotted, it opens up the aperture in the collar. To hold the door closed, a toggle arrangement is mounted on a pivot 43 on the collar. A toggle lever 44 is mounted on the pivot 43 and carries a catch 45. The catch 45 has an indentation 46 which engages a raised pin 47. Rotation of the toggle lever 44 in the direction of the arrow 48 disengages the catch 45 from the pin 47 and allows the door 38 to swing away from the collar 42.

When the door is in the closed position, and the toggle lever is in the position shown in FIG. 8 it can be prevented from moving by the piston rod 52. The piston rod is connected to a piston in communication with the inside of the collar, and when the collar is pressurised, the piston rod is forced out and locks the toggle lever in position. The piston rod is reset manually by pushing it into its cylinder against the internal pressure of the collar. If the pressure in the collar is low enough to allow the piston rod to be pushed back, it is low enough for the door to be opened in safety.

To hold the door 38 open, the recess 49 of the stay rod 50 is engaged with the pin 51. This prevents the door shutting. Alternatively the stay rod may be replaced by a power cylinder.

FIG. 9 illustrates the second form of door suspension. The door 53 is supported on a rocker cradle 54 which has a lower surface 55 running on a track 56. The lower surface 55 is so dimensioned that the path of the centre of gravity of the door follows the dotted line 57. The features of this path are that it has a substantially flat portion in the middle and a hump near the open end. This hump means that the door is stable in the open position. The path also rises at the closed end, which helps the initial movement of the door when it is being opened. An operating cylinder 58 is used to move the door, and an interlock cylinder 59 prevents the accidental opening of the door when the collar is pressurised. The interlock cylinder works in the same way as the interlock 17, 18 of FIG. 2.

An alternative form of seal is shown in FIG. 3. The face opposing the sealing surface 5 is stepped to receive an annulus 22 accommodating O ring seals 23 and 24 as shown. The annulus 22 is spaced from the walls of the step by gaps 25 and 26 of which the gap 25 is the larger and this, combined with the manner in which O ring 24 is positioned on the annulus, sets up a differential pressure across the ring which forces the latter into positive sealing engagement with the side wall 27 of the step.

FIG. 4 is a part section of another seal arrangement in which the step accommodates a metal annulus 28 having lands 29 forming a high pressure gasket seal. The annulus is grooved to receive O rings located as shown to set up a differential pressure forcing the lands into sealing contact with the lip 8.

In addition, FIG. 4 shows a pressure lock device. Clamp 13 has a semi-circular projection 13a while the lip 8 has a shallow semi-circular recess 8a. The extent of the projection 13a is insufficient to prevent sliding movement of the door 11 as described above but on pressurising the vessel, door 11 separates slightly from the collar and projection 13a moves into recess 8b. Sliding movement of the door is thereby prevented as long as the vessel is under pressure.

In FIG. 5 is shown a seal arrangement employing an expansible bellows or diaphragm 39 pressurised to give effective sealing by fluid pressure supplied via supply line 31. A locking device may be incorporated as shown at 8b/30a.

A resilient bi-plastic seal 32 is accommodated in the step in the embodiment shown in FIG. 6. The seal has lands 33 and is a press fit in the step. The seal has a relatively hard shell and a soft core which distorts under pressure. This permits slight depression of the seal as the co-operating surface lined with a facing 34 moves into place, and extension as the internal pressure of the vessel is raised.

The closure member arrangement described above may find application in many fields, for example it may be used in gas and oil equipment and pipelines, processing plant for example chemical processing plant, in hospital equipment for example sterilising equipment, in tankers for transporting fluids, in industrial eqiupment for example filters, ovens and test chambers and in marine vessels for example ships and submarines where it may be used to form a hatch.

It will be understood that a pipe or hose coupler embodying the invention is of similar construction to the closure door arrangement described above except that the second part is also of collar-like form, the arrangement thus providing a throughway for fluid flow.

FIG. 7 is a diagrammatic section of a typical coupler. Collar part 1 is fixed to one pipe 35 whilst the second collar part 11 is fixed to the other pipe 36. Both parts have the clamps described above and the coupler can be engaged and disengaged by movements in the directions of arrow 37. Suitable leak-preventing seals will be fitted and if necessary a lock will be provided for preventing accidental uncoupling movement of the parts of the coupler. In addition, the pressure lock described above may be incorporated.

FIGS. 10 and 11 show a quick release pipe insert. The insert 60 has a coupling arrangement 61, 62, on either end, and these couplings may be any one of those described above with reference to FIGS. 1 to 3 and FIGS. 5 to 7. The arrangement of FIG. 4 cannot be used as the insert 60 cannot move simultaneously to the right, to seal with pipe 61 and to the left to seal with the pipe 62. FIG. 11 shows the pipe insert in the open position, and illustrates a toggle 63 which locks the insert in position.

FIGS. 12 and 13 illustrate a water tight hatch for use in ship's bulkheads. The door 64 is mounted on a double pivot 65, 66 which allows the door to move in the direction of the arrow 67 to unseal itself.

I claim:
1. A coupler arrangement comprising:
   (a) a collar part adapted to be secured around an opening, said collar part having
       (1) a continuous sealing surface on the end face thereof, and
       (2) extending around part only of said sealing surface, at least one extension forming a clamp and defining a groove facing radially inwardly across the collar, and
       (3) associated with at least a part of the remainder of said sealing surface, a lip extending radially outwardly of the collar; said coupler arrangement having means forming a path;
   (b) a second part, said second part having
       (1) a continuous sealing surface adapted to mate with the sealing surface on the collar, and
       (2) associated with only part of the sealing surface of the second part, at least one lip which extends radially outwardly of said second part, and
       (3) extending around part at least of the remainder of the sealing surface of the second part at least one extension forming a collar clamp and defining a groove facing radially inwardly across said second part;
   (c) a rocking cradle, said rocking cradle
       (1) being connected to said second part,
       (2) having a supporting surface formed to rock along said path and disposed approximately radially of the center of gravity of the second part, and
       (3) being arranged to support said second part for movement across said collar part in one direction to an engaged position in which each lip of the second part is engaged with the extension defined groove of the collar and each lip of the collar is engaged with the extension defined groove of the second part, and in the opposite direction to a disengaged position in which said lips and grooves are disengaged from each other.

2. The coupler arrangement of claim 1 wherein said rocking cradle supports the second part for movement whereby the locus of the centre of gravity of the second part traverses a path having a horizontal centre portion, rising towards the engaged position and having a hump at the disengaged position.

3. The coupler arrangement of claim 2 wherein there is at least one said located in the collar continuous sealing surface responsive to the pressure differential between the inside and the outside of the opening, the seal being axially movable into sealing engagement with the continuous sealing surface of the second part in response to the pressure differential.

4. The coupler arrangement of claim 3 wherein the seal comprises a member of substantially rectangular cross-section carrying a first O-ring engageable with the sealing surface of the collar and a second O-ring engageable with the sealing surface of the second part.

5. The coupler arrangement of claim 1 wherein the clamps and lips are provided with a co-operating groove and projection, the projection being engageable with the walls defining the groove upon axial separation of the collar and the second part.

6. The coupler arrangement of claim 1 wherein the clamp on the collar extends around half the periphery of the collar and the clamp on the second part extends around half the periphery of the second part.

7. The coupler arrangement of claim 1 wherein there is provided a locking mechanism to prevent the second part being uncoupled from the first part whilst the coupler is pressurised.

8. The coupler arrangement of claim 7 wherein the locking mechanism comprises a piston movable within a cylinder by the fluid pressure within the coupler, the piston having a rod which obviates radial movement of the collar part relative to the second part.

9. The coupler of claim 1, wherein at least one extension associated with the collar is integral therewith, and the at least one extension associated with the second part is integral therewith.

10. The coupler of claim 1 wherein the second part is a closure member.

11. The coupler of claim 1 wherein there is provided a diaphragm seal located between the second part and the collar part, the diaphragm being pressurisable, when in use, by an external source of fluid to expand and form a seal between the sealing surfaces.

References Cited
UNITED STATES PATENTS

| | | | |
|---|---|---|---|
| 863,001 | 8/1907 | Seebeck | 285—96X |
| 2,449,659 | 9/1949 | Lane | 285—361X |
| 639,851 | 12/1899 | Harper | 285—325 |
| 2,492,006 | 12/1949 | Raybould | 285—379X |
| 3,246,793 | 4/1966 | Wade | 285—365X |
| 3,260,539 | 7/1966 | Herron | 285—67X |
| 3,298,794 | 1/1967 | Mikesell et al. | 285—95X |
| 3,428,340 | 2/1969 | Pelton | 285—95 |

FOREIGN PATENTS

| | | | |
|---|---|---|---|
| 366,697 | 2/1932 | Great Britain | 292—300 |
| 629,043 | 9/1949 | Great Britain | 292—300 |
| 918,271 | 9/1959 | Great Britain | 292—300 |
| 946,373 | 1/1964 | Great Britain | 277—58 |
| 1,020,540 | 2/1966 | Great Britain | 292—300 |
| 779,147 | 1/1935 | France | 285—69 |
| 1,223,094 | 1/1960 | France | 285—325 |
| 1,547,022 | 10/1968 | France | 285—349 |
| 840,220 | 7/1960 | Great Britain | 285—351 |

DAVE W. AROLA, Primary Examiner

U.S. Cl. X.R.

49—261; 220—38, 41, 46, 55.3; 285—83, 325, 349; 292—302